United States Patent [19]

Wiesendanger

[11] Patent Number: 4,998,589
[45] Date of Patent: Mar. 12, 1991

[54] VARIABLE SPEED DRILL CONTROL CAM APPARATUS

[76] Inventor: John A. Wiesendanger, 7331 Rustic Woods Dr., Dayton, Ohio 45424

[21] Appl. No.: 484,998

[22] Filed: Feb. 26, 1990

[51] Int. Cl.⁵ .............................................. H01H 9/06
[52] U.S. Cl. .................................... 173/170; 200/327; 310/50; 408/9
[58] Field of Search ................ 173/12, 168, 169, 170; 74/510; 200/327, 293.1, 332.2, 528, 522, 321, 324; 310/50, 68 A; 408/9, 214

[56] References Cited

U.S. PATENT DOCUMENTS

| | | | |
|---|---|---|---|
| 1,150,431 | 8/1915 | Heineman | 200/332.2 |
| 3,378,662 | 4/1968 | Sorenson | 200/522 |
| 3,383,943 | 5/1968 | Piber | 200/522 |
| 3,600,075 | 8/1971 | Winkler | 200/522 |
| 4,205,434 | 6/1980 | Brozoski et al. | 200/522 |
| 4,276,461 | 6/1981 | Piber | 200/321 |

Primary Examiner—Paul A. Bell
Assistant Examiner—Scott A. Smith
Attorney, Agent, or Firm—Leon Gilden

[57] ABSTRACT

A drill control organization includes a cam member rotatably mounted within spaced support blocks, wherein a forward support block is mounted within a side surface of a handle and coextensively therewith. A dial plate is mounted to a forward support shaft of the cam, including an indicator handle to effect selective rotation of the cam to provide a selective abutment surface in cooperation with a rear surface of a speed control trigger of a drill organization.

5 Claims, 5 Drawing Sheets

FIG. 7

| MATERIAL | 1/16 | 1/8 | 3/16 | 1/4 | 5/16 | 3/8 | 7/16 | 1/2 |
|---|---|---|---|---|---|---|---|---|
| WOOD | 7 | 7 | 8 | 9 | 9 | 10 | 9 | 8 |
| PLASTIC | 6 | 7 | 8 | 9 | 10 | 10 | 8 | 7 |
| FIBERGLASS | 6 | 7 | 8 | 8 | 8 | 8 | 7 | 6 |
| ALUMINUM | 4 | 5 | 7 | 9 | 7 | 4 | 4 | 3 |
| STEEL | 4 | 5 | 5 | 5 | 4 | 4 | 2 | 1 |
| CONCRETE | 4 | 4 | 4 | 3 | 3 | 2 | 2 | 1 |
| SETTING: | 1 | 2 | 3 | 4 | 5 | 6 | 7 | 8 | 9 | 10 |
| [RPM X 10Q] | 2 | 2.5 | 4 | 5.5 | 7 | 8 | 10 | 15 | 20 | 25 |

FIG. 8

| FT/LBS | 1/16 | 1/8 | 3/16 | 1/4 | 5/16 | 3/8 | 7/16 | 1/2 |
|---|---|---|---|---|---|---|---|---|
| 5–10 | 1 | 1 | 2 | 2 | 2 | 2 | 3 | 3 |
| 11–15 | 2 | 2 | 3 | 4 | 4 | 4 | 5 | 6 |
| 16–20 | 3 | 4 | 5 | 6 | 7 | 7 | 7 | 8 |
| 21–25 | 4 | 5 | 6 | 7 | 7 | 8 | 8 | 9 |
| 26–30 | 5 | 6 | 7 | 8 | 9 | 10 | 10 | * |
| 31–35 | 6 | 7 | 8 | 9 | 10 | 10 | * | * |
| 36–40 |  | 8 | 9 | 10 | 10 | * | * | * |
| 41–45 |  |  |  | 10 | 10 | * | * | * |
| 46–50 |  |  |  |  | * | * | * | * |
| 51–55 |  |  |  |  |  | * | * | * |

* UNABLE TO ACHIEVE FT/LBS FOR THIS SOCKET SIZE

VARIABLE SPEED DRILL CONTROL CAM APPARATUS

BACKGROUND OF THE INVENTION

1. Field of the Invention

The field of invention relates to variable speed control drills, and more particularly pertains to a new and improved variable speed drill control cam apparatus wherein the same permits selective abutment of a drill trigger to permit selective application of speed and torque in association with a drill.

2. Description of the Prior Art

The prior art has provided variable speed drill structures in association with various gear reduction motors and the like. The need for a variable speed drill is well understood in the prior art requiring the application of various speeds and torque in the drilling of various materials, such as wood, plastic, fiber glass, steel and the like. Examples of the prior art include U.S. Pat. No. 3,975,966 to Grozinger wherein a drill housing accommodates a variable speed motor in cooperation with a gear reduction gear set to apply various torque to an associated output shaft of the drill structure.

U.S. Pat. No. 4,280,359 to Schmid, et al., provides a hammer drill capable of rotation and/or axial impacting of the tool chuck in association with the drill.

U.S. Pat. No. 3,436,980 to Loge, et al., sets forth a transmission provided with a variable speed control trigger in association with a surgical drill.

U.S. Pat. No. 2,861,460 to Lips, et al., sets forth an automatically variable gearing device for use with a tap arrangement.

U.S. Pat. No. 2,772,576 to Ross sets forth a two-speed transmission gear mechanism for use in various drive organizations, such as a fishing reel, with clear application to a drill structure as well.

As such, it may be appreciated that there continues to be a need for a new and improved variable speed drill control cam apparatus wherein the same addresses both the problems of ease of use, as well as effectiveness in construction in permitting selective application of output torque and associated speed to a drill organization and in this respect, the present invention substantially fulfills this need.

SUMMARY OF THE INVENTION

In view of the foregoing disadvantages inherent in the known types of variable speed drill apparatus now present in the prior art, the present invention provides a variable speed drill control cam apparatus wherein the same permits selective abutment and positioning of a cam surface relative to a rear portion of a trigger of a drill arrangement to provide an effective and readily employed abutment surface to limit and determine the drill's output speed and torque for use in the drilling of various materials. As such, the general purpose of the present invention, which will be described subsequently in greater detail, is to provide a new and improved variable speed drill control cam apparatus which has all the advantages of the prior art variable speed drills and none of the disadvantages.

To attain this, the present invention provides a drill control organization including a cam member rotatably mounted within spaced support blocks, wherein a forward support block is mounted within a side surface of a handle and coextensively therewith. A dial plate is mounted to a forward support shaft of the cam, including an indicator handle to effect selective rotation of the cam to provide a selective abutment surface in cooperation with a rear surface of a speed control trigger of a drill organization.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved variable speed drill control cam apparatus which has all the advantages of the prior art variable speed drill apparatus and none of the disadvantages.

It is another object of the present invention to provide a new and improved variable speed drill control cam apparatus which may be easily and efficiently manufactured and marketed.

It is a further object of the present invention to provide a new and improved variable speed drill control cam apparatus which is of a durable and reliable construction.

An even further object of the present invention is to provide a new and improved variable speed drill control cam apparatus which is susceptible of a low cost of manufacture with regard to both materials and labor, and which accordingly is then susceptible of low prices of sale to the consuming public, thereby making such variable speed drill control cam apparatus economically available to the buying public.

Still yet another object of the present invention is to provide a new and improved variable speed drill control cam apparatus which provides in the apparatuses and methods of the prior art some of the advantages thereof, while simultaneously overcoming some of the disadvantages normally associated therewith.

Still another object of the present invention is to provide a new and improved variable speed drill control cam apparatus wherein the same permits selective and effective torque and speed output of an associated variable speed drill structure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGS. 7 and 8 are examples of setting controls for application of the instant invention to a particular drill and torque output application.

DESCRIPTION OF THE PREFERRED EMBODIMENT

Figure 1:
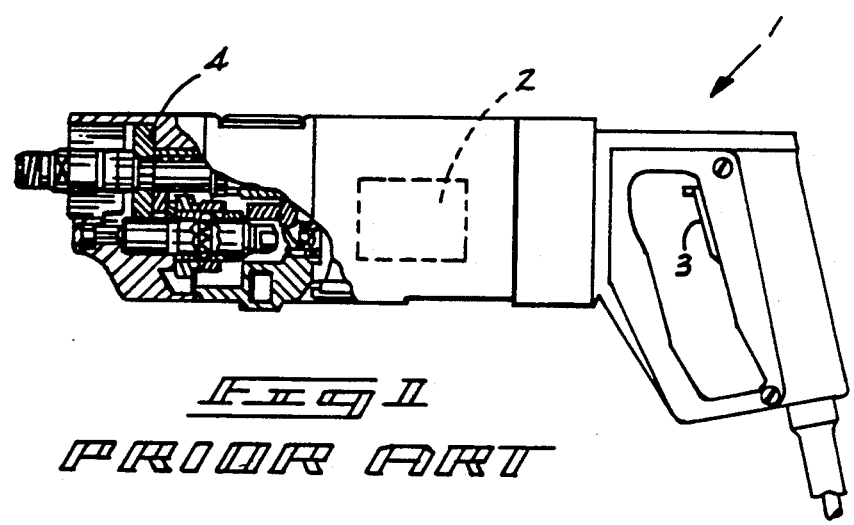
FIG. 1 is an orthographic side view, taken in elevation, of a prior art variable speed drill apparatus.
Figure 2:
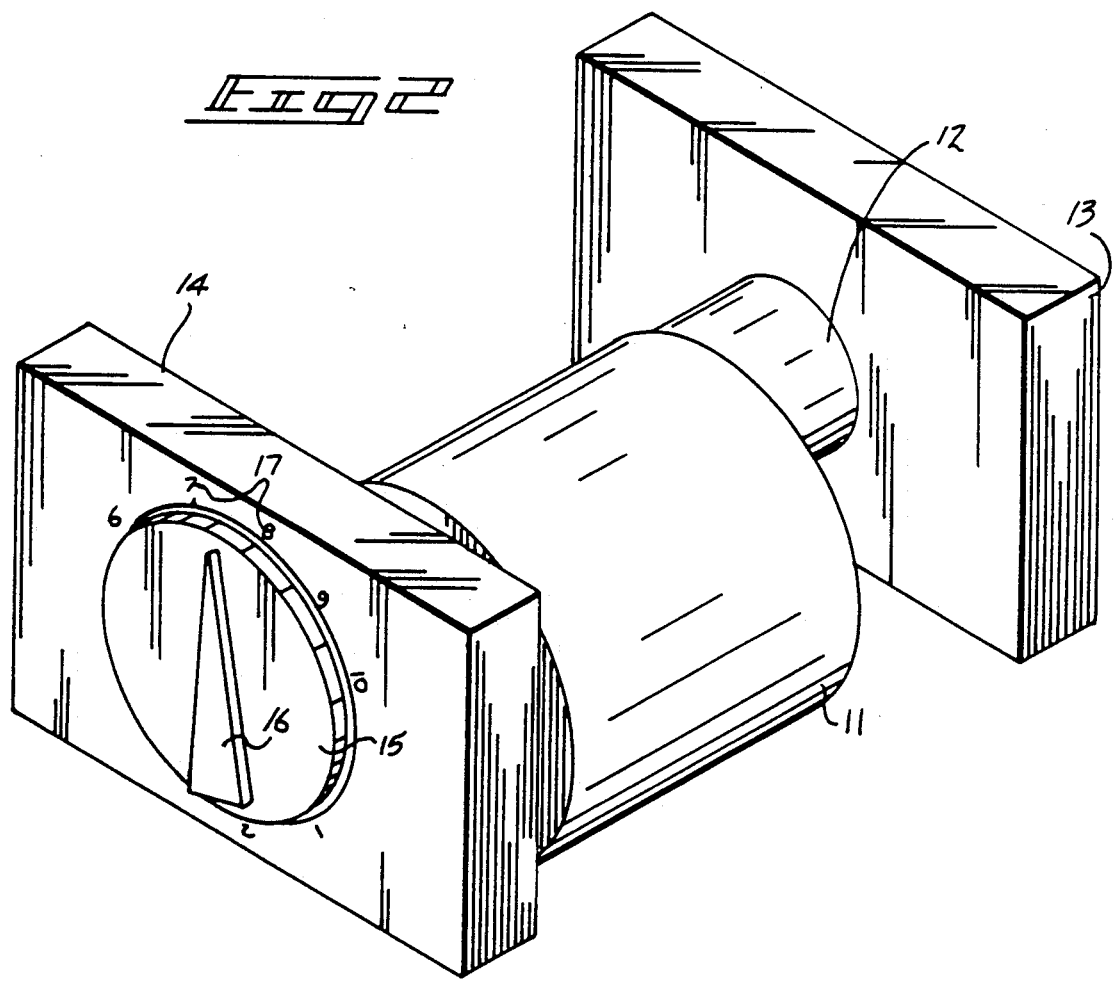
FIG. 2 is an isometric illustration of the abutment cam apparatus of the instant invention.
Figure 3:
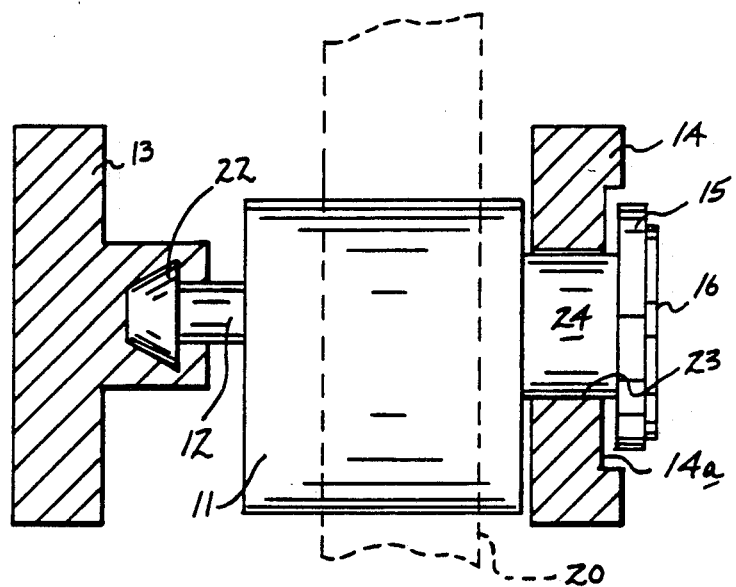
FIG. 3 is an orthographic front view taken in elevation of the cam organization as set forth in FIG. 2.
Figure 4:
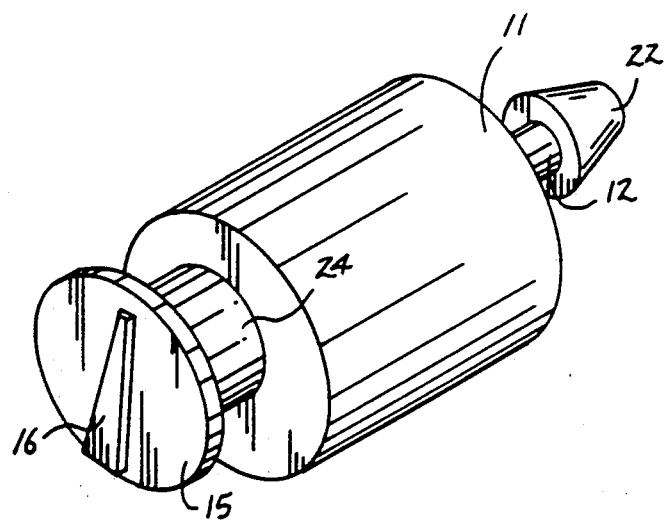
FIG. 4 is an isometric illustration of the cam organization removed from the associated support blocks.

With reference now to the drawings, and in particular to FIGS. 1 to 8 thereof, a new and improved variable speed drill control cam apparatus embodying the principles and concepts of the present invention and generally designated by the reference numeral 10 will be described.

FIG. 1 illustrates a typical prior art variable speed drill apparatus 1, including a variable speed motor 2, with a gear reduction set 4 to provide variable outtput to an output shaft of the drill organization.

Figure 5:
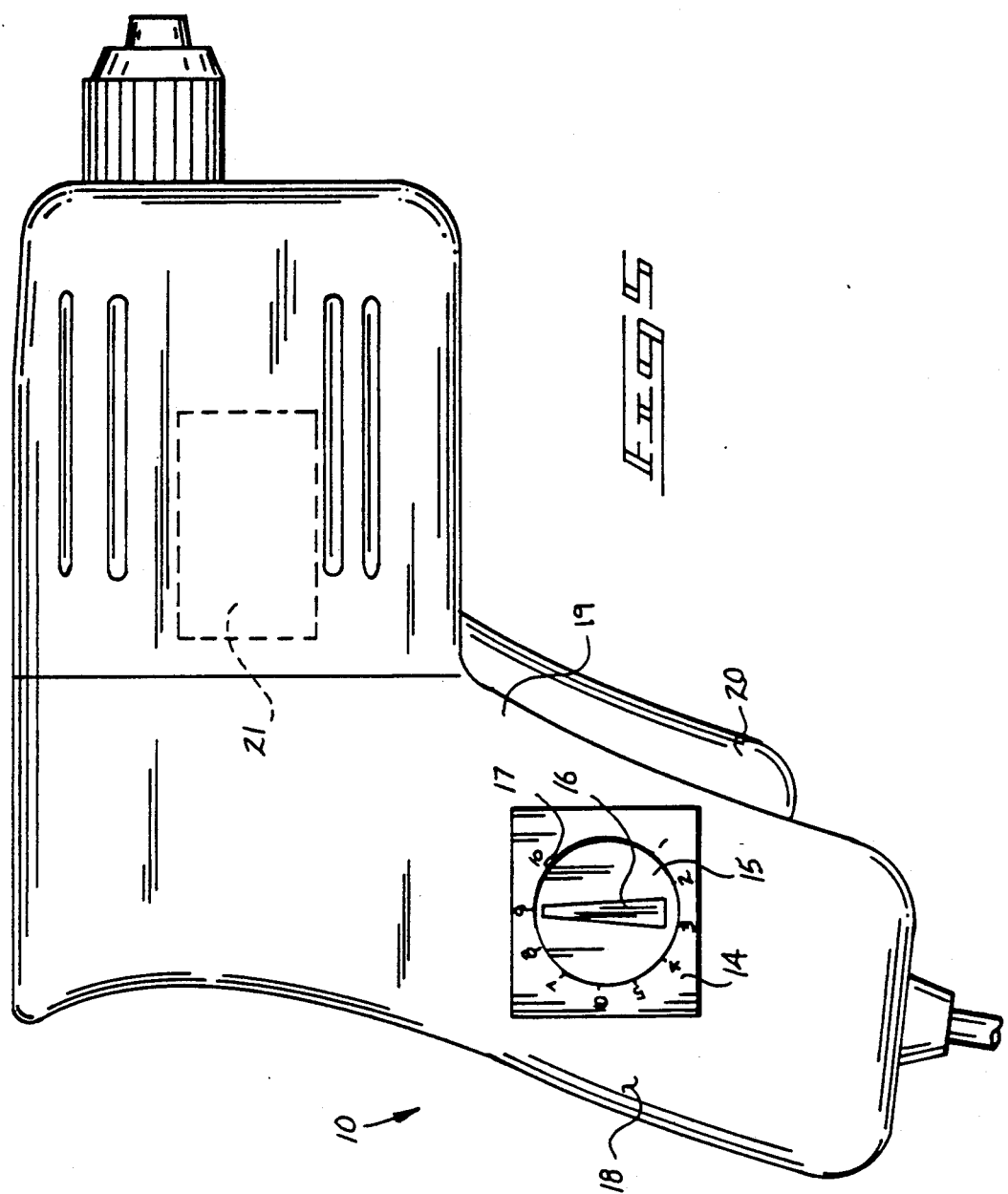
FIG. 5 is an orthographic side view taken in elevation of the instant invention mounted within a respective variable speed control drill.
Figure 6:
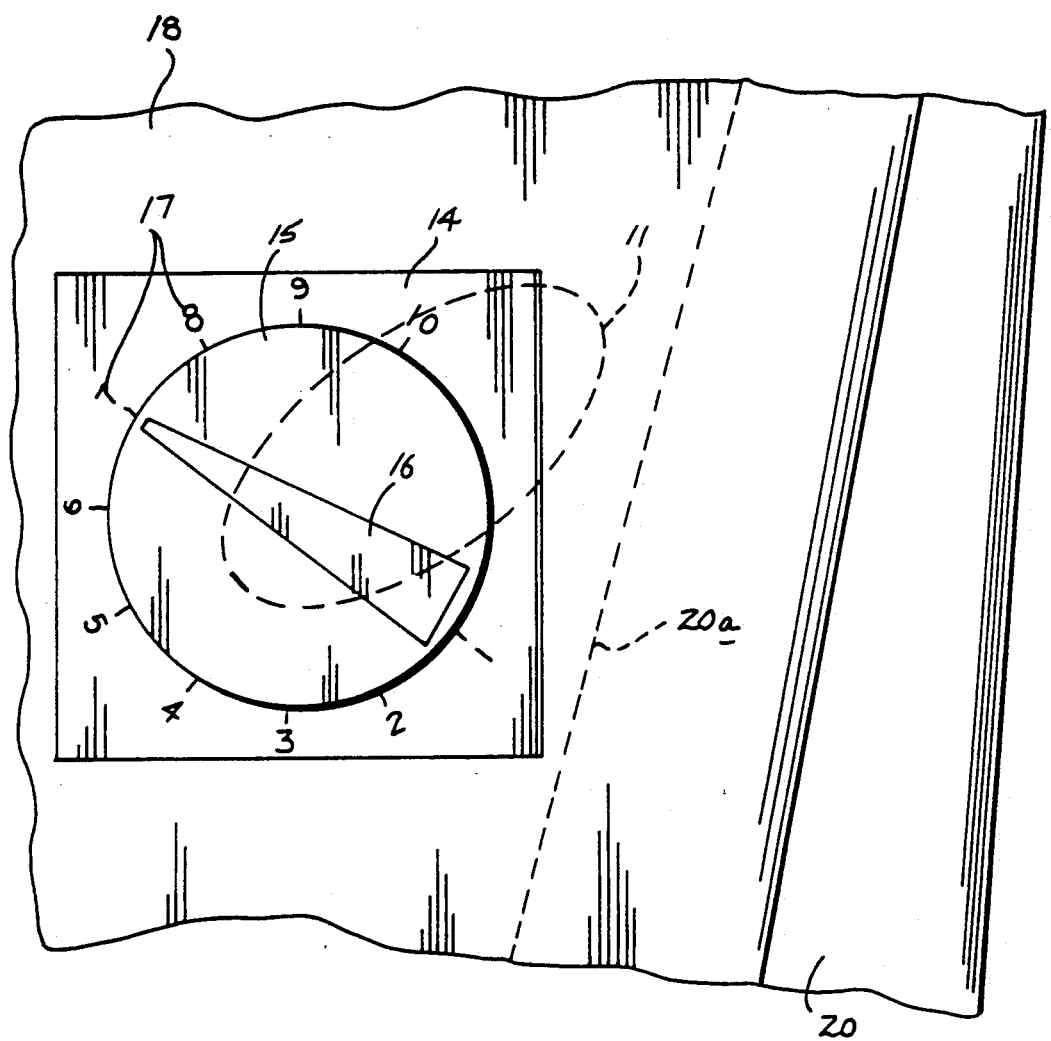
FIG. 6 is an orthographic side view taken in elevation, somewhat enlarged, of the control dial in cooperation with the cam utilized by the instant invention.

More specifically, the variable speed drill control cam apparatus 10 of the instant invention essentially comprises a combination in use with a variable speed drill, as illustrated in FIG. 5 for example. The control mechanism of the instant invention is typically illustrated in FIG. 2, wherein an abutment cam 11 is rotatably mounted about its cam axis, with a rear cam support shaft 12 directed rearwardly of a rear face of the cam 11 and rotatably mounted within a rear support bearing block 13. The abutment cam 11 further includes a forward cam support shaft 24 (see FIGS. 3 and 4 for example) that is coaxially aligned with the rear cam support shaft 12 and extends forwardly of a forward face of the cam 11 and is rotatably mounted within a forward support bearing block 14 rotatable within a cylindrical bearing opening 23 formed within the bearing block 14. A dial plate 15 is fixedly and orthogonally mounted to a forward end of the forward cam support shaft 24 and receivable within a recess 14a formed within a forward face of the bearing block 14 to minimize projection of the dial relative to a right side wall 18 of an associated drill handle 19 of the associated drill utilized by the instant invention. An indicator handle 16 mounted in a projecting manner relative to a forward face of the dial plate 15 cooperates with a series of indicia 17 formed in a surrounding relationship relationship to the dial plate 15, whereupon positioning of the forward indicator portion of the indicator handle 16 with a preset indicia relative to the speed or torque determination chart 25 or 26 of FIGS. 7 and 8 provide selective torque and speed output of the associated drill. The drill includes a speed control trigger 20 cooperative with a variable speed motor 21, whereupon positioning of the cam surface of the abutment cam 11 relative to a rear edge abutment surface 20a of the trigger 20, permits rearward positioning of the trigger 20 relative to the associated handle 19 and accordingly limits the output speed of the variable speed motor 21. For example, (see FIG. 6) rotation of the indicator handle 16 accordingly rotates the cam 11 relative to the rear edge abutment surface 20a and accordingly the trigger 20 is permitted limited retraction within the handle 16 and accordingly limits the speed of the associated variable speed motor 21, wherein penetration of the trigger 20 within the handle 19 is directed proportional to the output speed of the motor 21 and is effectively limited by the by the positioning of the cam surface of the abutment cam 11 effected by rotation of the indicator handle 16.

The rear cam support shaft 12 is rotatably mounted within the rear support bearing block 13 by a trucated conical head member 22 captured rotatably within the bearing block 13. In this manner, the cam 11 and the associated dial plate 15 and indicator handle 16 are fixedly positioned relative to the right side wall 18 in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A variable speed drill control cam apparatus in combination with a variable speed drill including a variable speed motor and an elongate housing,
the elongate housing includes a handle member, and the handle member including a right side wall, and the handle member further including a trigger member reciprocatably mounted interiorly of the handle member, the trigger including a forward edge positioned exteriorly of the handle member, and
a rear edge mounted interiorly of the handle member, the apparatus further including,
a cam means rotatably mounted within the handle member, with the cam means positioned for providing selective abutment of the rear edge of the trigger.

2. An apparatus as set forth in claim 1 wherein the cam means includes an elongate cam, the cam including a cam axis arranged generally orthogonally relative to the rear edge of the trigger.

3. An apparatus as set forth in claim 2 wherein the cam means comprises an elongate cam defining a cam surface, the cam surface arranged generally orthogonally relative to the rear edge of the trigger, and the cam including a rear cam support shaft directed exteriorly from a rear face of the cam, and a forward cam support shaft directed forwardly of a forward face of the cam, the rear shaft and the forward shaft arranged coaxially relative to one another and integrally mounted to the cam.

4. An apparatus as set forth in claim 3 wherein the rear cam shaft includes a truncated conical head member, the head member rotatably captured within a rear support bearing block, the rear support bearing block spaced interiorly of the handle, and further including a forward support bearing block, the forward support bearing block including a cylindrical bearing opening for rotatably mounting the forward support shaft therewithin.

5. An apparatus as set forth in claim 4 including a dial plate orthogonally and integrally mounted to a forward terminal end of the forward cam support shaft, and the dial plate mounted within a recess formed within a forward face of the forward support bearing block, and the dial plate further including an indicator handle mounted integrally onto a forward face of the dial plate, the indicator handle cooperative with a circumferentially aligned series of spaced indicia to visually provide indication of relative orientation of the cam relative to the rear edge of the trigger.

* * * * *